(12) United States Patent
Ida et al.

(10) Patent No.: US 6,337,031 B1
(45) Date of Patent: Jan. 8, 2002

(54) FLAME-RETARDANT RESIN MAGNET MATERIAL

(75) Inventors: Takeshi Ida; Naoshi Marutani, both of Mooka; Eiji Aoishi, deceased, late of Kobe, all of (JP), by Kiyoko Aoishi, Yoshiko Aoishi, Tsutomu Aoishi, heirs

(73) Assignees: Kaneka Corporation, Osaka; Tochigi Kaneka Corporation, Mooka, both of (JP)

( * ) Notice: Subject to any disclaimer, the term of this patent is extended or adjusted under 35 U.S.C. 154(b) by 0 days.

(21) Appl. No.: 09/446,266

(22) PCT Filed: Apr. 20, 1999

(86) PCT No.: PCT/JP99/02095

§ 371 Date: Apr. 10, 2000

§ 102(e) Date: Apr. 10, 2000

(87) PCT Pub. No.: WO99/54891

PCT Pub. Date: Oct. 28, 1999

(30) Foreign Application Priority Data

Apr. 21, 1998 (JP) .......................................... 10/110982

(51) Int. Cl.$^7$ ............................ H01F 1/08; H01F 1/113; H01J 29/54
(52) U.S. Cl. ................................ 252/62.54; 252/62.55; 252/609; 355/212; 355/217; 355/201; 355/156
(58) Field of Search ........................... 252/62.54, 62.55, 252/609; 335/212, 217, 156, 201; 106/18.28, 18.22, 18.13

(56) References Cited

U.S. PATENT DOCUMENTS 6,043,728 A * 3/2000 Ida et al. ..................... 335/212

FOREIGN PATENT DOCUMENTS

| JP | 53133257 A | * 11/1978 |
| JP | 1-201347 | 8/1989 |
| JP | 5-335127 | 12/1993 |

* cited by examiner

Primary Examiner—C. Melissa Koslow
(74) Attorney, Agent, or Firm—Armstrong, Westerman, Hattori, McLeland & Naughton, LLP

(57) ABSTRACT

There is provided a resin magnet material that has excellent flame retardancy, produces only a small amount of toxic substances when ignited, and yields very few molding defects; as well as an electron beam adjustment apparatus in which this resin magnet material is used. To achieve this object, a first invention comprises a flame-retardant resin magnet material obtained by adding (Z) an alnico-based magnetic powder or a ferrite-based magnetic powder to a flame-retardant resin composition that is itself obtained by adding heat-resistant aluminum hydroxide and antimony trioxide to a polyamide resin in the following amounts: (A) per 100 weight parts polyamide resin, (B) X1 weight parts heat-resistant aluminum hydroxide with a decomposition temperature of 280° C. or higher (where 10 weight parts<X1<70 weight parts), and (C) X2 weight: parts antimony trioxide (where 40 weight parts<X2<270 weight parts). A second invention entails further adding zinc borate in a prescribed amount, and a third invention entails adding guanidine sulfamate in a prescribed amount.

9 Claims, 3 Drawing Sheets

FLAME-RETARDANT RESIN MAGNET MATERIAL

BACKGROUND OF THE INVENTION

1. Field of the Invention

The present invention relates to flame-retardant resin magnet material that can be used in electrical appliances, building materials, and various other fields, and more particularly to a flame-retardant resin magnet material suitable for use in electrical appliances operated for extended periods of time in high-temperature environments, and to an electron beam adjustment apparatus obtained using this flame-retardant resin magnet material.

2. Description of the Related Art

A wide variety of synthetic resin materials have by now been introduced into our daily lives on a large scale and in a variety of forms. With electrical products, for example, large numbers of components made of synthetic resin materials are used as the constituent parts of such products, both large and small. Most of the synthetic resin materials for such synthetic resin components are organic materials, and are thus flammable and have high calorific value, so when these synthetic resin components are heated more than necessary, they ignite and burn, creating a possibility of major fires.

Television receivers, for example, are equipped with electron beam adjustment apparatus obtained by incorporating a plurality of annular magnets into the neck portion of a color picture tube. These annular magnets are molded from resin magnet materials obtained by adding magnetic powders to resin compositions. Because the electron beam adjustment apparatus are disposed adjacent to power generation units that generated considerable amounts of heat, these annular magnets are sometimes heated beyond the allowable limit, in which case the contained resin may ignite and burn, creating a danger that a fire or the like will occur. It is therefore imperative that flame retardancy be conferred on resin magnet materials, which serve as the molding materials for the annular magnets used in electron beam adjustment apparatus.

As typified by such electron beam adjustment apparatus, the resin magnet materials used in electrical products often must be flame retardant, and this requirement has tended to become progressively more stringent in recent years, with the issue of rendering currently flammable resin magnet materials flame retardant gradually becoming a very important element in terms of designing commercial products. Because various standards (for example, the UL standard in the USA) have been instituted concerning the flame retardancy of resin compositions, resin magnet materials also need to satisfy these standards, and continued efforts aimed at satisfying these standards are being made to achieve flame retardancy in resin magnet materials.

Well-known methods for achieving flame retardancy in flammable synthetic resin materials include (1) adding flame retardants to synthetic resin materials, (2) admixing inorganic fillers into synthetic resin materials, (3) compounding synthetic resin materials and flame-retardant polymers, (4) copolymerizing flame-retardant polymers with synthetic resin materials, and other methods. Bromine- or chlorine-based halogen substances have commonly been selected and used as such flame-retardants, inorganic fillers, flame-retardant polymers, flame-retardant monomers, or the like. Halogen-based substances, while possessing excellent flame retardancy, are also known to produce dioxins and other toxic substances during burning. The environmental impact of the toxic substances produced during burning have recently become a concern, and techniques aimed at enhancing flame retardancy without the use of halogen-based flame retardants are being developed. Such techniques are described, for example, in Unexamined Patent Application (Kokai) 1-201347 (Japanese Unexamined Patent Gazette).

This application discloses a polyolefin-based resin composition whose flame retardancy is enhanced by the addition of a nonhalogen-based flame retardant to ethylene, vinyl acetate, or the like. It is also disclosed that combinations of antimony trioxide with aluminum hydroxide, magnesium hydroxide, and other metal oxide hydrates can be used as such nonhalogen-based flame retardants. According to this technique, resin compositions exhibiting excellent flame retardancy can be obtained without the use of halogen-based substances.

This technique, however, still poses problems when applied to an electron beam adjustment apparatus, which is a typical application for the flame-retardant resin magnet material of the claimed invention.

The first problem is that no study has yet been conducted concerning the effect of a magnetic powder on flame retardancy when this powder is added to the resin composition in question, and that no proof has yet been obtained as to whether a magnetic powder is capable of preserving its stable magnetic characteristics in the presence of such flame retardants.

The second problem is that voids form inside the resin composition or that warping or deformation occurs. Aluminum hydroxide or magnesium hydroxide afford flame retardancy by releasing water ($H_2O$) when heated, but when released at the heating temperature at which annular magnets are molded, this water ($H_2O$) is trapped inside the molding, creating voids, warping, or deformation in the molding.

The issue that can be cited as a third problem is that it is completely unclear whether polyamide resins can be used as base resins, not to mention the fact that no information is yet available concerning the mixing ratios of various flame retardants in cases in which such polyamide resins are used as base resins. Polyamide resins are often used in electrical appliances because of considerations related to wear resistance, machining precision, heat resistance, mechanical strength, and the like, but the aforementioned techniques still cannot be used as reference because of the absence of any mention of the mixing ratios of various flame retardants in cases in which polyamide resins are used as base resins. In these conditions, a need existed for a resin magnet material that would be obtained by employing a polyamide resin as the base resin and that would have excellent flame retardancy and produce moldings devoid of voids, warping, deformation, or the like.

SUMMARY OF THE INVENTION

As a result of painstaking research aimed at overcoming the aforementioned problems, the inventors have succeeded in defining the specific aspects that should be adopted when polyamide resins are used as base resins in resin magnet materials obtained using halogen-based flame retardants. As used herein, the term "specific aspects" primarily refer to the types and mixing ratios of the flame retardants used.

The present invention can be broadly divided into the following three groups.

The inventions belonging to the first group reside in a flame-retardant resin magnet material obtained by adding (Z) an alnico-based magnetic powder or a ferrite-based magnetic powder to a flame-retardant resin composition that is itself obtained by adding heat-resistant aluminum hydroxide and antimony trioxide to a polyamide resin in the following amounts:

(A) per 100 weight parts polyamide resin, (B) X1 weight parts heat-resistant aluminum hydroxide with a decomposition temperature of 280° C. or higher (where 10 weight parts<X1<70 weight parts), and (C) X2 weight parts antimony trioxide (where 40 weight parts<X2<270 weight parts).

The alnico-based magnetic powder is beneficial because of its less pronounced heat demagnetization, which is a phenomenon in which magnetic characteristics are adversely affected when the temperature rises, whereas the ferrite-based magnetic powder is beneficial because is it inexpensive and readily available.

The inventions belonging to the second group reside in a flame-retardant resin magnet material obtained by adding (Z) an alnico-based magnetic powder or a ferrite-based magnetic powder to a flame-retardant resin composition that is itself obtained by adding heat-resistant aluminum hydroxide, antimony trioxide, and zinc borate to a polyamide resin in the following amounts:

(A) per 100 weight parts polyamide resin, (B) X1 weight parts heat-resistant aluminum hydroxide with a decomposition temperature of 280° C. or higher (where 10 weight parts<X1<70 weight parts), (C) X2 weight parts antimony trioxide (where 40 weight parts<X2<250 weight parts), and (D) X3 weight parts zinc borate (where 0 weight part<X3<20 weight parts).

This claim is different from the inventions of the first group in that zinc borate is added.

Of these flame-retardant resin magnet materials, those obtained using alnico-based magnetic powders as magnetic powders undergo little demagnetization during a temperature increase and possesses stable magnetic characteristics. Because the present flame-retardant resin magnet material is such that a halogen-based system alone is used as the flame retardant, and a polyamide resin (nonhalogen-based substance) is used as the base resin itself, incineration produces very little or no toxic substances.

In addition, a compound having a decomposition temperature of 280° C. or higher is used as the heat-resistant aluminum hydroxide. The important point is that the temperature of 280° C. is higher than the molding temperature of the annular magnets. The decomposition temperature of a common aluminum hydroxide is about 230° C., causing of the $H_2O$ decomposed/dehydrated at this temperature to be released. For example, annular magnets are commonly molded at 250–260° C., and when the decomposition temperature of aluminum hydroxide is lower than the molding temperature, the $H_2O$ released by the endothermic/dehycLration reactions of the aluminum hydroxide enters the molten base resin being molded and accumulates there, causing voids, warping, or deformation to occur in the resulting molding. In the flame-retardant resin magnet material of the present invention, aluminum hydroxide whose decomposition temperature is higher than the molding temperature of the resin composition is selected to avoid this.

The flame-retardant resin magnet material of the present invention exhibits excellent flame retardancy over a wide range of temperatures. This is attributed to the following factors.

The flame-retardant resin magnet materials belonging to the first group are endowed with flame retardancy by the synergy of the flame-retardant effect based on antimony trioxide ($Sb_2O_3$) and the flame-retardant effect based on the heat-resistant aluminum hydroxide. Specifically, if heating occurs for any reason and this heating causes the temperature of the flame-retardant resin magnet material to rise to 270° C. or above, reactions involving the heat-resistant aluminum hydroxide are first initiated, and burning is prevented by the water ($H_2O$) resulting from the decomposition of the heat-resistant aluminum hydroxide. When the temperature subsequently rises to 450–460° C., the heat-resistant aluminum hydroxide stops reacting and the antimony trioxide starts melting. This spreads across the resin surface, creating air-blocking action and preventing burning. Thus, the $H_2O$ released by the endothermic/dehydration reactions of the heat-resistant aluminum hydroxide contributes to burning prevention at comparatively low temperatures, and the air-blocking action of the molten antimony trioxide contributes to burning prevention at comparatively high temperatures. As a result, flame retardancy is achieved over the entire temperature range of 270–700° C. required by the UL standard.

The flame-retardant resin magnet materials belonging to the second group, in addition to having this action, demonstrate the flame retardant effect provided by the zinc borate. The flame retardant effect of the zinc borate is based on the decomposition-induced heat absorption/dehydration. Care should be exercised in this case because glowing is apt to occur if too much zinc borate has been added.

It is suggested that the following limiting elements be appended as the more-preferred aspects of the first and second groups.

The mixing ratio of the polyamide resin and the alnico-based magnetic powder or ferrite-based magnetic powder should preferably be 50–10 vol % alnico-based magnetic powder or ferrite-based magnetic powder per 50–90 vol % polyamide resin.

A compound having an average particle size r of 1 $\mu m<r<4$ $\mu m$ should be used as the heat-resistant aluminum hydroxide. Flame retardancy is stabilized and productivity improved when the average particle size r of the heat-resistant aluminum hydroxide falls within the range 1 $\mu m<r<4$ $\mu m$. An r-value that is lower than necessary results in diminished compounding with synthetic resins and in impaired resin fluidity during injection molding because of increased specific surface, with the result that productivity is adversely affected, whereas an r-value that is higher than necessary impairs surface activity and fails to adequately promote decomposition of the heat-resistant aluminum hydroxide, making it impossible to achieve adequate flame retardancy. Both flame retardancy and productivity are adequate, however, when r satisfies the condition 1 $\mu m<r<4$ $\mu m$.

The flame-retardant resin magnet materials belonging to the third group of the present inventions are as follows.

The flame-retardant resin magnet materials are obtained by adding (Z) an alnico-based magnetic powder or a ferrite-based magnetic powder to a flame-retardant resin composition that is itself obtained by adding heat-resistant aluminum hydroxide, antimony trioxide, and guanidine sulfamate to a polyamide resin in the following amounts:

(A) per 100 weight parts polyamide resin, (B) X1 weight parts heat-resistant aluminum hydroxide with a decomposition temperature of 280° C. or higher (where 10 weight parts<X1<70 weight parts), (C) X2 weight parts antimony trioxide (where 30 weight parts<X2<170 weight parts), and (E) X4 weight parts guanidine sulfamate (where 5 weight parts<X4<20 weight parts).

These flame-retardant resin magnet materials differ from the aforementioned first and second groups in containing guanidine sulfamate.

A flame-retardant resin magnet material belonging to the third group is provided with an excellent flame retardant effect by the respective synergy of the respective flame retardant actions of the heat-resistant aluminum hydroxide, antimony trioxide, and guanidine sulfamate. Specifically, the inert guanidine sulfamate gas inhibits flaming during initial burning; a reaction involving the heat-resistant aluminum hydroxide starts when the temperature rises to 300° C.; and burning is prevented by the $H_2O$ produced by endothermic/ dehydration reactions. When the temperature subsequently rises to 450–460° C., the heat-resistant aluminum hydroxide stops reacting and the antimony trioxide starts melting. This spreads across the resin surface, creating air-blocking action and preventing burning. As a result, flame retardancy is achieved over the entire temperature range required by the UL standard. This flame-retardant resin magnet material demonstrates a better flame retardant effect than do the aforementioned materials of the first and second groups as a result of the added action of the inert guanidine sulfamate gas, which suppresses flaming during initial burning.

It is suggested that the following limiting elements be appended as the more-preferred aspects of the inventions of the third group.

The mixing ratios of the flame-retardant resin composition (obtained by adding (B), (C), and (E) to (A) as described above) and the alnico-based magnetic powder or ferrite-based magnetic powder (Z) should preferably be 45–5 vol % alnico-based magnetic powder or ferrite-based magnetic powder per 55–95 vol % flame-retardant resin composition.

When an alnico-based magnetic powder is used as the magnetic powder, 40–80 μm should be selected as the average particle size thereof.

When a ferrite-based magnetic powder is used as the magnetic powder, strontium ferrite or barium ferrite should preferably be employed, and 1.0–3.0 μm should be selected as the average particle size thereof.

Electron beam adjustment apparatus can be fabricated using each of the flame-retardant resin magnet materials broadly divided into the three groups described above. With such electron beam adjustment apparatus, the aforementioned flame-retardant resin magnet materials are used as base materials for the annular magnets incorporated into the electron beam adjustment apparatus, and these flame-retardant resin magnet materials are applicable as some or all of the base materials of quadrupole or sextupole convergence-adjusting magnets or dipole purity-adjuisting magnets.

Such electron beam adjustment apparatus will not ignite or burn when heated as a result of being placed close to a power generation unit, and will produce only negligible amounts of toxic substances if burning does occur. In the particular case of an alnico-based magnetic powder being used as the magnetic powder, a temperature increase produces only a slight reduction in magnetic characteristics (heat demagnetization), making it possible to obtain annular magnets for electron beam adjustment apparatus capable of demonstrating a stable convergence-adjusting effect.

DESCRIPTION OF THE PREFERRED EMBODIMENTS

Specifics of the present invention will now be described based on examples and drawings.

Figure 1:
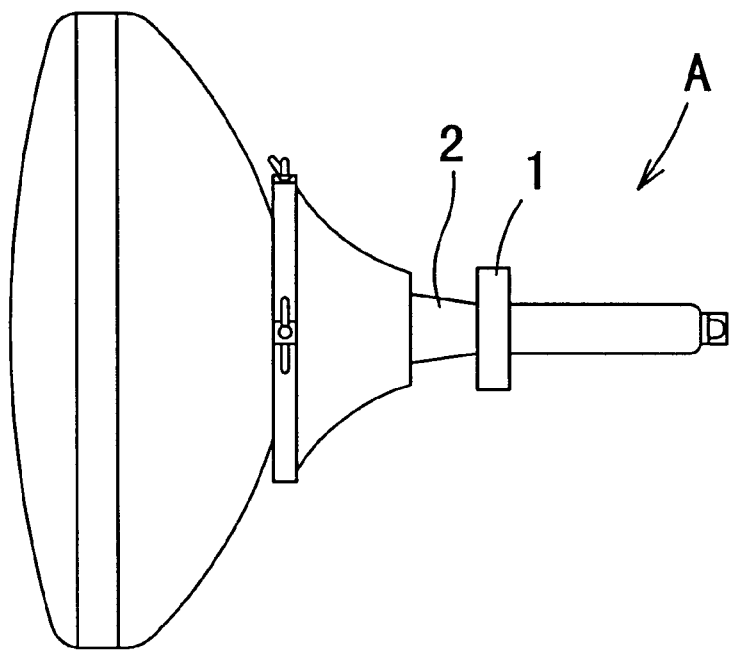
FIG. 1 is a schematic depicting a color picture tube.
Figure 2:
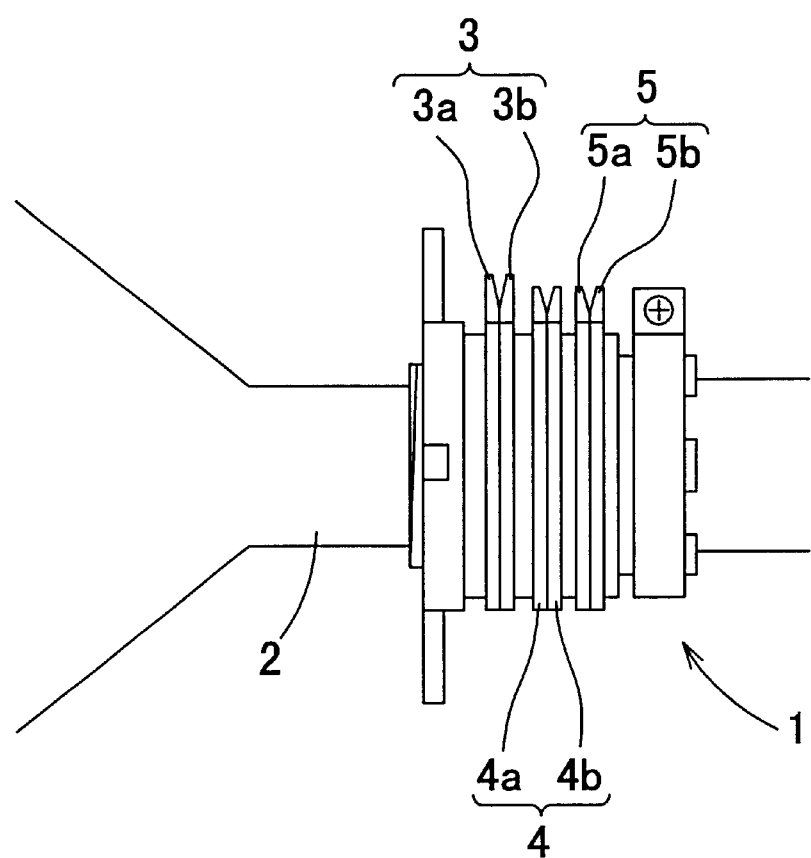
FIG. 2 is a fragmentary enlarged view depicting the periphery of the area where the electron beam adjustment apparatus of a color picture tube is attached.
Figure 3:
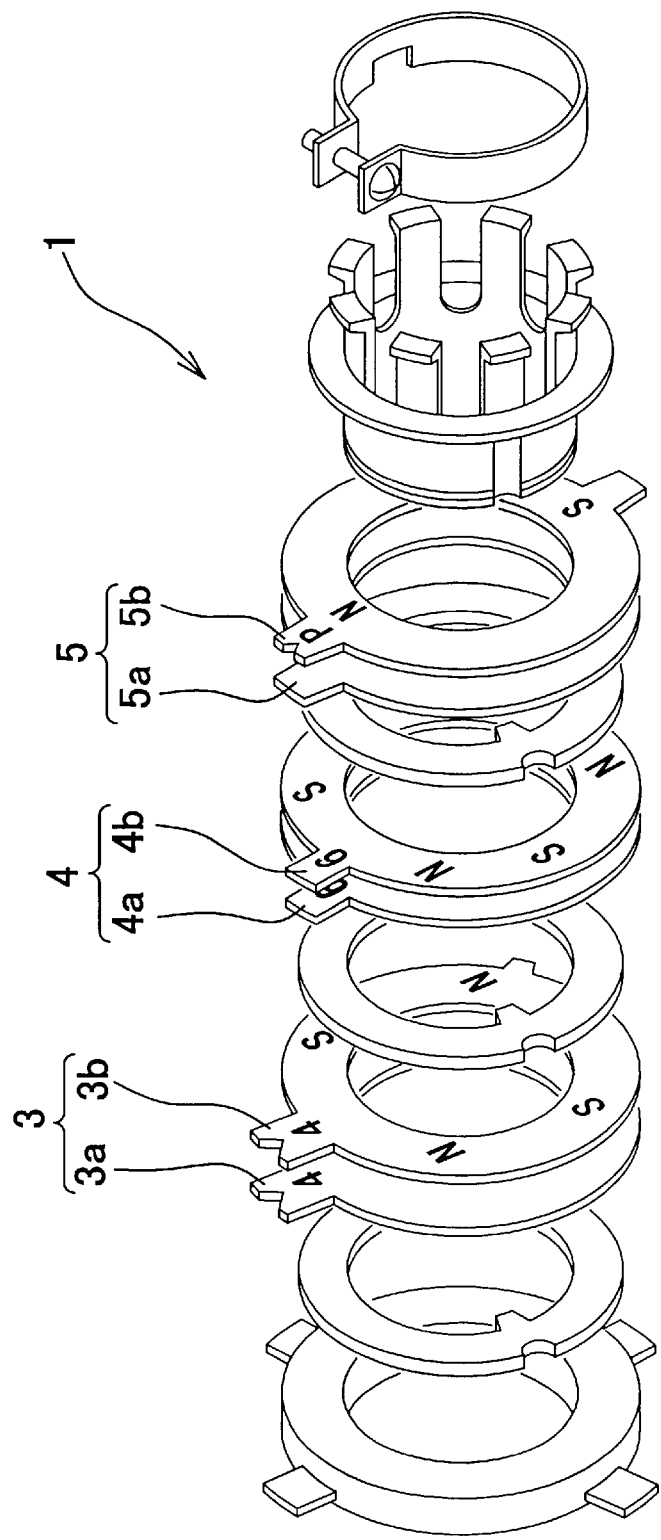
FIG. 3 is a fragmentary perspective view of the electron beam adjustment apparatus.

FIG. 1 depicts a color picture tube into which an electron beam adjustment apparatus is incorporated, FIG. 2 is a fragmentary enlarged view depicting the periphery of the attachment area of the electron beam adjustment apparatus, and FIG. 3 is a fragmentary perspective view of the electron beam adjustment apparatus. As shown in FIG. 1, the electron beam adjustment apparatus 1 obtained using the flame-retardant resin magnet material of the present invention is operated after being mounted on the neck portion 2 of a color picture tube.

As shown in FIGS. 2 and 3, the electron beam adjustment apparatus is configured by mounting the following pairs of magnets on a plastic cylindrical holder with interposed annular spacers: a pair of quadrupole (four magnetic poles) convergence magnets 3a, 3b; sextupole (six magnetic poles) convergence magnets 4a, 4b; and dipole (two magnetic poles) purity-adjusting magnets 5a, 5b such that the electron beam is adjusted by the rotation of the annular magnets separately or as combinations. The flame-retardant resin magnet material is used as a material for the annular magnets in the electron beam adjustment apparatus thus configured.

The flame-retardant resin magnet material of the present invention is used as a material for the quadrupole convergence magnets 3a, 3b, sextupole convergence magnets 4a, 4b, and dipole purity-adjusting magnets 5a, 5b. Although each of the annular magnets can be manufactured in its entirety from the same flame-retardant resin magnet material, it is more practical in terms of cost to use, for example, a flame-retardant resin magnet material containing an alnico-based magnetic powder for the magnets in which the effect of heat demagnetization on adjustment precision is the most pronounced (for example, quadrupole convergence magnets), and to employ an inexpensive flame-retardant resin magnet material obtained using a ferrite-based magnetic powder for other magnets.

Objects of the present invention are a flame-retardant resin magnet material and an electron beam adjustment apparatus in which this flame-retardant resin magnet material is used. Of these, flame-retardant resin magnet materials can be broadly divided into the following three groups.

First Group

Includes materials obtained by adding an alnico-based magnetic powder or a ferrite-based magnetic powder to a flame-retardant resin composition that is itself obtained by adding antimony trioxide and a heat-resistant aluminum hydroxide having a decomposition temperature of 280° C. or higher to a polyamide resin (nonhalogen-based resin).

Second Group

Includes materials obtained by adding an alnico-based magnetic powder or a ferrite-based magnetic powder to a flame-retardant resin composition that is itself obtained by adding antimony trioxide or zinc borate and a heat-resistant aluminum hydroxide having a decomposition temperature of 280° C. or higher to a polyamide resin (nonhalogen-based resin). This group differs from the aforementioned first group in that zinc borate is added.

Third Group

Includes materials obtained by adding an alnico-based magnetic powder or a ferrite-based magnetic powder to a flame-retardant resin composition that is itself obtained by adding heat-resistant aluminum hydroxide, antimony trioxide, and guanidine sulfamate to a polyamide resin (nonhalogen-based resin). These materials differ from the above-described flame-retardant resin magnet material of the first group in that guanidine sulfamate is added.

In the present invention, an alnico-based magnetic powder or ferrite-based magnetic powder is used as the magnetic powder. Alnico-based magnetic powders retain stable magnetic field strength (undergo little heat demagnetization) with varying temperatures and are suitable as magnet materials for electron beam adjustment apparatus. Ferrite-based magnetic powders, on the other hand, are inferior to alnico-based magnetic powders in terms of magnetic field strength stability, but are still used because of their advantageously low cost.

Using an alnico-based magnetic powder yields a flame-retardant resin magnet material of low heat demagnetization. Using a ferrite-based magnetic powder, while allowing more heat demagnetization to occur than in the case of an alnico-based magnetic powder, is still beneficial because of low cost and ready availability.

A polyamide resin (nonhalogen-based resin) is used as the base resin. Polyamide resins have excellent heat resistance and curing properties, and are also advantageous in terms of wear resistance, machining precision, mechanical strength, and the like.

A heat-resistant aluminum hydroxide with a decomposition temperature of 280° C. or higher is used as the aluminum hydroxide. The average particle size r of the heat-resistant aluminum hydroxide should preferably fall within the range $1 \mu m < r < 4 \mu m$. This is because an average particle size r below $1 \mu m$ results in a larger specific surface and in diminished compounding with resins, lowering resin fluidity during injection molding and adversely affecting productivity. Another reason is that an r-value in excess of $4 \mu m$ inhibits surface activity and is thus incapable of adequately promoting the decomposition of the metal oxide hydrate, failing to fulfill the function of endowing the resin composition with flame retardancy.

The mixing ratios of the heat-resistant aluminum hydroxide and antimony trioxide should preferably be such that the number of weight parts $X1$ of the heat-resistant aluminum hydroxide and the number of weight parts $X2$ of the antimony trioxide are such that 10 weight parts $< X1 < 70$ weight parts and 40 weight parts $< X2 < 270$ weight parts, respectively, per 100 weight parts polyamide resin. The polyamide resin content decreases and molding is impaired when there are more than 70 weight parts heat-resistant aluminum hydroxide and more than 270 weight parts antimony trioxide. On the other hand, the flame retardant effect is difficult to demonstrate adequately if there are less than 10 weight parts heat-resistant aluminum hydroxide and less than 40 weight parts antimony trioxide.

When a heat-resistant aluminum hydroxide, antimony trioxide, and zinc borate are used, the mixing ratios of these components should preferably be such that the number of weight parts $X1$ of the heat-resistant aluminum hydroxide, the number of weight parts $X2$ of the antimony trioxide, and the number of weight parts $X3$ of the zinc borate are such that 10 weight parts $< X1 < 110$ weight parts, 40 weight parts $< X2 < 250$ weight parts, and 0 weight part $< X3 <$ and 20 weight parts, respectively, per 100 weight parts polyamide resin. It is also preferable for the total of the number of weight parts $X2$ of the antimony trioxide and the number of weight parts $X3$ of the zinc borate to be such that 40 weight parts $< (X2+X3) < 270$ weight parts.

Care should be exercised when an excessively large amount (more than 20 weight parts) of zinc borate is used, because glowing is apt to occur in this case. Situations in which zinc borate alone is used together with a metal oxide hydrate without the addition of antimony trioxide should also be avoided because glowing and cotton ignition tend to occur in such cases.

When guanidine sulfamate is added besides the heat-resistant aluminum hydroxide and antimony trioxide, the number of weight parts $X4$ of the guanidine sulfamate should be such that 5 weight parts $< X4 < 20$ weight parts. This is because when the amount $X4$ in which guanidine sulfamate is added is less the 5 weight parts, the addition is too small, and the flame retardant effect demonstrated by the guanidine sulfamate, that is, the flaming suppression effect demonstrated by the decomposition gas, is too weak, whereas an amount in excess of 20 weight parts results in a situation in which too much heat is evolved by the decomposition of the guanidine sulfamate, and this heat interferes with the flaming suppression effect demonstrated by the decomposition gas.

An alnico-based magnetic powder or ferrite-based magnetic powder is used as the magnetic powder. Alnico magnetic powders having aluminum (Al), nickel (Ni), cobalt (Co), and iron (Fe) as their principal components may be used as such alnico-based magnetic powders, as can cobalt-free magnetic powders composed of aluminum, nickel, and iron as principal components and known under the common name "Alnico." Alnico-based magnetic powders are advantageous in that they have excellent heat resistance and exhibit low heat demagnetization when used for a long time at high temperatures. Ferrite-based magnetic powders, on the other hand, have somewhat high heat demagnetization and are inferior to alnico-based magnetic powders in terms of heat resistance, but are still advantageous in terms of low cost and ready availability.

The alnico-based magnetic powder or ferrite-based magnetic powder should preferably be added in a ratio of 50–10 vol % per 50–90 vol % flame-retardant resin composition. When the magnetic powder is added in a ratio of more than 50 vol %, the resin content decreases, and lower fluidity is achieved during compounding and molding, resulting in reduced productivity. When the magnetic powder is added in a ratio of less than 10 vol %, the material has insufficient magnetic field strength when made into a bond magnet and is incapable of functioning adequately as a convergence magnet or purity-adjusting adjusting magnet.

When an alnico-based magnetic powder is used as the magnetic powder, a range of $40-80 \mu m$ should be selected as the average particle size thereof. When the average particle size is less than $40 \mu m$, a higher proportion of the magnetic powder has a small particle size, the effect of oxidation or particle size distortion in crystals becomes more pronounced, the coercive force of the magnetic powder decreases, and a lower magnetic field strength results. Increasing the average particle size to over $80 \mu m$, on the other hand, results in a situation in which large particles tend to accumulate on the side opposite the gate of the mold during injection molding, differences in density are created in the molding, and the magnetic field strength becomes less uniform as a result.

Strontium ferrite or barium ferrite can be employed when a ferrite-based magnetic powder is used. A range of 1.0–3.0 $\mu m$ may be selected for the average particle size. When the average particle size is less than $1.0 \mu m$, the specific surface of the ferrite increases, compounding with the polyamide resin is adversely affected, and the fluidity of the resins being compounded is lowered. As a result, moldability and molding stability are compromised, and productivity is adversely affected. On the other hand, increasing the particle size of the ferrite is disadvantageous because in this case the individual particles of the ferrite form numerous domains, a smaller proportion of the magnetic powder has monodomain particle sizes, a lower coercive force results, and magnetic field strength is reduced.

Examples and practical examples of the present invention are described below, and the flame retardancy thereof is evaluated.

EXAMPLES 1–5

Resin magnet materials were fabricated by adding 12 vol % alnico-based magnetic powder to a resin composition obtained by adding X1 weight parts heat-resistant aluminum hydroxide and X2 weight parts antimony trioxide (10 weight part<X1<70 weight parts, 40 weight parts<: X2<270 weight parts) per 100 weight parts polyamide resin (base resin, nonhalogen-based resin composition). The materials were used in Examples 1–5. The heat-resistant aluminum hydroxide used therein had an average particle size r of 3 μm. In addition, a magnetic powder having a maximum particle size of 100 μm or less and an average particle size of 70 μm was used as the alnico-based magnetic powder.

Also fabricated were materials whose compositions were similar to those in Examples 1–5 but in which the number of weight parts X1 of the heat-resistant aluminum hydroxide was 5 weight parts and 10 weight parts, that is, was outside the aforementioned range of 10 weight parts<X1<110 weight parts. These materials were used in Comparative Examples 1 and 2.

A material was also fabricated using a bromine compound (halogen-based substance) instead of the heat-resistant aluminum hydroxide. This material was classed as a conventional product because in contained a halogen-based substance. This materials was designated as belonging to Comparative Example A to distinguish it from the aforementioned Comparative Examples 1 and 2. Specifically, the material of Comparative Example A was obtained by adding 12 vol % alnico-based magnetic powder to a resin composition containing 80 weight parts of the bromine compound decabromodiphenyl oxide (DBDPO) and 40 weight parts antimony trioxide per 100 weight parts polyamide resin.

The ratios in which the materials were mixed in Examples 1–5 and Comparative Examples 1 and 2 re shown in Table 1. The ratios in which the materials were mixed in Comparative Example A are shown in Table 2.

TABLE 1

| | Magnetic powder content (vol %) | Polyamide resin (weight parts) | Flame retardant (weight parts) | |
|---|---|---|---|---|
| | | | Antimony trioxide | Heat-resistant aluminum hydroxide |
| Example 1 | 12 | 100 | 50 | 50 |
| Example 2 | 12 | 100 | 60 | 50 |
| Example 3 | 12 | 100 | 70 | 50 |
| Example 4 | 12 | 100 | 260 | 15 |
| Example 5 | 12 | 100 | 140 | 20 |
| Comparative Example 1 | 12 | 100 | 60 | 5 |
| Comparative Example 2 | 12 | 100 | 40 | 10 |

TABLE 2

| | Magnetic powder content (vol %) | Polyamide resin (weight parts) | Flame retardant (weight parts) | |
|---|---|---|---|---|
| | | | Antimony trioxide | DBDPO |
| Comparative Example A | 12 | 100 | 40 | 80 |

Combustion tests were subsequently performed on the resin magnet materials of Examples 1–5 and Comparative Examples 1, 2, and A. The test method was as follows. Starting materials were first weighed out, introduced into a mixer, and agitated and mixed. The resulting mixture was pelletized with a kneader. The pellets were subsequently molded into shapes measuring 127 mm×12.7 mm×1.6 mm (thickness) with an injection molding machine, and used as test pieces. The test pieces underwent a combustion test in accordance with the UL94 vertical combustion test. The UL94 vertical combustion test, which was developed by UL (Underwriters' Laboratories Inc.) in 1972, is widely known as an authoritative testing technique for grading the flame retardancy of plastic materials. Because many electrical products must meet certain safety requirements, the results of this test have been adopted by many manufacturers (makers) as guidelines for indicating the safety of plastic materials. The test results are shown in Table 3. In the UL standard, "V-0" designates a burning time of 10 seconds or less with flaming, and a burning time of 30 seconds or less without flaming (no cotton ignition); "V-1" designaesitt a burning time of 30 seconds or less with flaming, and a burning time of 60 seconds or less without flaming (no cotton ignition); and "V-2" designates a burning time of 30 seconds or less with flaming, and a burning time of 60 seconds or less without flaming (cotton ignition).

TABLE 3

| | Burning time with flaming (sec) | Burning time without flaming (sec) | Cotton ignition yes/no | UL rating |
|---|---|---|---|---|
| Example 1 | 7 | 16 | No | V-0 |
| Example 2 | 7 | 13 | No | V-0 |
| Example 3 | 6 | 12 | No | V-0 |
| Example 4 | 8 | 20 | No | V-0 |
| Example 5 | 6 | 22 | No | V-0 |
| Comparative Example 1 | 8 | 33 | No | V-1 |
| Comparative Example 2 | 14 | 29 | Yes | V-2 |
| Comparative Example A | 3 | 13 | No | V-0 |

As shown in Table 3, the claimed resin magnet materials of Examples 1–5 had a UL rating of V-0 and exhibited exceptional flame retardancy. By contrast, Comparative Examples 1 and 2, which are characterized by a low aluminum hydroxide content, had ratings of V-1 and V-2, respectively, and exhibited poor flame retardancy. The conventional product of Comparative Example A, which was obtained using the halogen-based substance DBDPO, had a flame retardancy rating of V-O and was again proven to be an excellent material in terms of flame retardancy, reconfirming the results obtained in the past (putting aside the problems caused by the environmental pollution during disposal).

It was thus learned that the claimed resin magnet materials of Examples 1–5, despite having compositions completely devoid of such halogen-based substances, could exhibit flame retardancy on a par with that of Comparative Example A, which was obtained using a halogen-based substance.

In addition, annular magnets were molded using the flame-retardant resin magnet materials of Examples 1–5, and it was found that the resulting moldings did not have any voids, warping, or deformation. The molding temperature was 255° C.

Based on the fact that Examples 1–5 and Comparative Example A (which pertained to a conventional product obtained using a bromine compound) had the same content of magnetic powders, it was estimated that the same magnet characteristics were achieved, and it was assumed that there was no difference in magnetic induction between the two types of products during actual use.

The above examples involved adding antimony trioxide and a heat-resistant aluminum hydroxide to a polyamide resin. Resin magnet materials of Examples 6 and 7 were also fabricated by further adding zinc borate, and these materials were subjected to the same tests as above.

EXAMPLES 6, 7

Resin magnet materials were fabricated by adding 12 vol % alnico-based magnetic powder to a resin composition obtained by fixing the number of weight parts X1 of heat-resistant aluminum hydroxide at 100 and adding antimony trioxide and zinc borate such that the number of weight parts X2 of the antimony trioxide was 60 and, at the same time, the number of weight parts X3 of the zinc borate was such that 0 weight part<X3<20 weight parts. The resulting materials were used in Examples 6 and 7. The heat-resistant aluminum hydroxide used therein had an average particle size r of 3 μm.

In Comparative Example 3, a resin magnet material was fabricated by adding 12 vol % alnico-based magnetic powder to a resin composition obtained by keeping the weight parts of the polyamide resin, heat-resistant aluminum hydroxide, and antimony trioxide at the same numeric values as in the above-described Examples 6 and 7 while varying the mixing ratios such that the number of weight parts X3 of zinc borate was outside the range of 0 to 20 weight parts. Table 4 shows the mixing ratios of the materials in Comparative Example 3 and Examples 6 and 7.

TABLE 4

| | | Flame retardant (weight parts) | | | |
|---|---|---|---|---|---|
| | Magnetic powder content (vol %) | Polyamide resin (weight parts) | Heat-resistant aluminum hydroxide | Antimony trioxide | Zinc borate |
| Example 6 | 12 | 100 | 100 | 60 | 5 |
| Example 7 | 12 | 100 | 100 | 60 | 10 |
| Comparative Example 3 | 12 | 100 | 100 | 60 | 25 |

The resin magnet materials of Comparative Example 3 and Examples 6 and 7 were subsequently subjected to combustion tests in accordance with the UL94 vertical combustion test by the same method as described above. The results are shown in Table 5 together with the results for the aforementioned Comparative Example A.

TABLE 5

| | Burning time with flaming (sec) | Burning time without flaming (sec) | Cotton ignition yes/no | UL rating |
|---|---|---|---|---|
| Example 6 | 8 | 23 | No | V-0 |
| Example 7 | 8 | 26 | No | V-0 |
| Comparative Example 3 | 12 | 28 | Yes | V-2 |
| Comparative Example A | 3 | 13 | No | V-0 |

Table 5 indicates that the resin magnet materials of Examples 6 and 7 have a UL rating of V-0 and exhibit exceptional flame retardancy. This flame retardancy was confirmed to be on a par with that of Comparative Example A, in which the halogen-based substance DBDPO was used. By contrast, the resin magnet material of Comparative Example 3, in which zinc borate was added in an amount above the prescribed range, had a UL rating of V-2 and possessed inadequate flame retardancy.

In addition, annular magnets were molded using the flame-retardant resin magnet materials of Examples 6 and 7, and it was found that the resulting moldings did not have any voids, warping, or deformation.

Based on the fact that Comparative Example A (which pertained to a conventional product obtained using a bromine compound) and Examples 6 and 7 had the same content of magnetic powders, it was estimated with regard to magnet characteristics that the same characteristics were achieved, and it was assumed that there was no difference in magnetic induction between the two types of products during actual use.

It was thus possible to obtain excellent flame-retardant resin magnet materials that had the same high level of flame retardancy as when conventional halogen-based substances were used, even when appropriate amounts of antimony trioxide and zinc borate are added at the same time.

Starting materials were subsequently added under the same conditions as in the Examples 1–3 described above, except that the average particle size r of the heat-resistant aluminum hydroxide was changed to 8 μm, and the resulting materials were designated Comparative Examples 4–6. Table 6 shows the mixing ratios of the materials in Comparative Examples 4–6 together with the mixing ratios of the materials in Examples 1–3 (the latter are shown for comparison purposes).

TABLE 6

| | | | Flame retardant (weight parts) | | Average particle size of heat-resistant aluminum hydroxide (μm) |
|---|---|---|---|---|---|
| | Magnetic powder content (vol %) | Polyamide resin (weight parts) | Antimony trioxide | Heat-resistant aluminum hydroxide | |
| Example 1 | 12 | 100 | 50 | 100 | 3 |
| Example 2 | 12 | 100 | 60 | 100 | 3 |
| Example 3 | 12 | 100 | 70 | 100 | 3 |
| Comparative Example 4 | 12 | 100 | 50 | 100 | 8 |
| Comparative Example 5 | 12 | 100 | 60 | 100 | 8 |
| Comparative Example 6 | 12 | 100 | 70 | 100 | 8 |

The resin magnet materials of Comparative Examples 4–6 were subsequently subjected to combustion tests in accordance with the UL94 vertical combustion test by the same method as described above. The results are shown in Table 7 together with the test results for the previously completed Comparative Examples 1–3.

TABLE 7

|  | Burning time with flaming (sec) | Burning time without flaming (sec) | Cotton ignition yes/no | UL rating |
|---|---|---|---|---|
| Example 1 | 7 | 16 | No | V-0 |
| Example 2 | 7 | 13 | No | V-0 |
| Example 3 | 6 | 12 | No | V-0 |
| Comparative Example 4 | 8 | 26 | Yes | V-2 |
| Comparative Example 5 | 9 | 25 | Yes | V-2 |
| Comparative Example 6 | 9 | 27 | Yes | V-2 |

The UL rating was V-2 for the resin magnet materials of Comparative Examples 4–6, which were fabricated under the same mixing conditions as in Examples 1–3 except that the average particle size r of the flame-retardant resin magnet material was changed to 8 μm. This was attributed to the fact that increasing the average particle size r of the flame-retardant resin magnet material beyond what was necessary had inhibited surface activity and resulted in the inability to adequately promote the decomposition of metal oxide hydrates, making it more difficult to fulfill the function of providing the resin magnet material with flame retardancy.

Flame-retardant resin magnet materials were subsequently fabricated using heat-resistant aluminum hydroxide, antimony trioxide, and guanidine sulfamate as flame retardants, and evaluations were conducted concerning the flame retardancy of flame-retardant resin magnet materials obtained by varying the amounts in which the various flame retardant were admixed. These evaluations were conducted for materials with low, medium, and high contents of alnico-based magnetic powders (11 vol %, 24 vol %, and 30 vol %, respectively). Flame retardancy was evaluated by performing combustion tests in accordance with the UL94 vertical combustion test in the same manner as in the examples described above. Tables 8, 10, 12, and 14 below show the mixing ratios of the materials in the flame-retardant resin magnet materials subjected to these tests. The test results are shown in Tables 9, 11, 13, and 15.

EXAMPLES 8–11

Low Content of Alnico-based Magnetic Powder

TABLE 8

|  |  |  | Flame retardant (weight parts) | | |
|---|---|---|---|---|---|
|  | Magnetic powder content (vol %) | Polyamide resin (weight parts) | Antimony trioxide | Heat-resistant aluminum hydroxide | Guanidine sulfamate |
| Example 8 | 11 | 100 | 110 | 50 | 10 |
| Example 9 | 11 | 100 | 70 | 60 | 10 |
| Example 10 | 11 | 100 | 130 | 40 | 10 |
| Example 11 | 11 | 100 | 50 | 60 | 10 |
| Comparative Example 7 | 11 | 100 | 170 | 20 | — |
| Comparative Example 8 | 11 | 100 | 20 | 80 | — |

TABLE 8-continued

|  |  |  | Flame retardant (weight parts) | | |
|---|---|---|---|---|---|
|  | Magnetic powder content (vol %) | Polyamide resin (weight parts) | Antimony trioxide | Heat-resistant aluminum hydroxide | Guanidine sulfamate |
| Comparative Example 9 | 11 | 100 | 170 | 20 | 5 |
| Comparative Example 10 | 11 | 100 | 30 | 80 | 5 |

TABLE 9

|  | Burning time with flaming (sec) | Burning time without flaming (sec) | Cotton ignition yes/no | UL rating |
|---|---|---|---|---|
| Example 8 | 5 | 8 | No | V-0 |
| Example 9 | 6 | 3 | No | V-0 |
| Example 10 | 7 | 2 | No | V-0 |
| Example 11 | 8 | 5 | No | V-0 |
| Comparative Example 7 | 14 | 15 | Yes | V-2 |
| Comparative Example 8 | 15 | 14 | Yes | V-2 |
| Comparative Example 9 | 8 | 16 | Yes | V-2 |
| Comparative Example 10 | 5 | 13 | Yes | V-2 |

Instead of the test pieces with a thickness of 1.6 mm that had been used in Examples 1–7 above, 0.9-mm and 1.3-mm test pieces were used as the test pieces for the combustion tests.

Tables 8 and 9 show that each of Examples 8–11, for which the amount of added guanidine sulfamate had been set at 10 weight parts, had a UL rating of V-0 and exhibited exceptional flame retardancy. By contrast, Comparative Examples 7–10, in which the guanidine sulfamate had been added in an amount of 5 weight parts or less, had a UL rating of V-2 and possessed inadequate flame retardancy. It was also estimated that an excessively large addition of guanidine sulfamate caused the decomposing guanidine sulfamate to generate too much heat, allowing this heat to inhibit the flaming suppression effect of the decomposition gas. Based on a separately conducted series of tests, the inventors confirmed that the amount of guanidine sulfamate should be set below 20 weight parts.

It was thus concluded that the amount in which guanidine sulfamate is added (number of weight parts X4) should preferably be kept such that 5 weight parts<X4<20 weight parts.

It was also determined that the flame-retardant resin magnet materials of Examples 8–11 had better flame retardancy than did the flame-retardant resin magnet materials of Examples 1–7. This conclusion was based on the fact that the test pieces used in these tests did not burn despite being thinner and more flammable than the test pieces with a thickness of 1.6 mm used in Examples 1–7.

In addition, annular magnets were molded using the flame-retardant resin magnet materials of Examples 8–11, and it was found that the resulting moldings did not have any voids, warping, or deformation. It was also confirmed based on a separately conducted series of tests concerning magnetic characteristics that the addition of guanidine sulfamate did not have any adverse effect on the magnetic characteristics.

EXAMPLES 12–15

Medium Content of Alnico-based Magnetic Powder

The content of alnico-based magnetic powder was increased to 24 vol %, and the resulting flame retardancy was evaluated. The same test pieces (0.9 mm and 1.3 mm) as those used in the aforementioned Examples 8–11 were employed as the test pieces for the combustion tests.

TABLE 10

| | | Flame retardant (weight parts) | | |
|---|---|---|---|---|
| | Magnetic powder content (vol %) | Polyamide resin (weight parts) | Antimony trioxide | Heat-resistant aluminum hydroxide | Guanidine sulfamate |
| Example 12 | 24 | 100 | 80 | 40 | 10 |
| Example 13 | 24 | 100 | 120 | 20 | 10 |
| Example 14 | 24 | 100 | 60 | 60 | 10 |
| Example 15 | 24 | 100 | 55 | 50 | 10 |
| Comparative Example 11 | 24 | 100 | 30 | 70 | 10 |
| Comparative Example 12 | 24 | 100 | 30 | 70 | 5 |
| Comparative Example 13 | 24 | 100 | 20 | 80 | 10 |
| Comparative Example 14 | 24 | 100 | 20 | 80 | 5 |

TABLE 11

| | Burning time with flaming (sec) | Burning time without flaming (sec) | Cotton ignition yes/no | UL rating |
|---|---|---|---|---|
| Example 12 | 4 | 5 | No | V-0 |
| Example 13 | 6 | 4 | No | V-0 |
| Example 14 | 8 | 2 | No | V-0 |
| Example 15 | 7 | 4 | No | V-0 |
| Comparative Example 11 | 7 | 14 | Yes | V-2 |
| Comparative Example 12 | 6 | 16 | Yes | V-2 |
| Comparative Example 13 | 8 | 7 | Yes | V-2 |
| Comparative Example 14 | 5 | 21 | Yes | V-2 |

Based on a comparison between Tables 10, 11 and Tables 8, 9, it was confirmed that increasing the content of alnico-based magnetic powder to 24 vol % does not result in lower flame retardancy.

In addition, Comparative Examples 11–14, in which the content of antimony trioxide was less than 30 weight parts, failed to yield adequate flame retardancy. This makes it possible to conclude that the presence of antimony trioxide is indispensable for maintaining high flame retardancy when guanidine sulfamate is added.

Annular magnets were molded using the flame-retardant resin magnet materials of Examples 12–15, and it was found that the resulting moldings did not have any avoids, warping, or deformation.

EXAMPLES 16–19

High Content of Alnico-based Magnetic Powder

The content of alnico-based magnetic powder was increased to 30 vol %, and the resulting flame retardancy was evaluated. Because the flame retardancy was observed to decrease somewhat in comparison with the Examples 12–15 described above, 1.3-mm and 1.5-mm test pieces were used for the combustion tests.

TABLE 12

| | | | Flame retardant (weight parts) | | |
|---|---|---|---|---|---|
| | Magnetic powder content (vol %) | Polyamide resin (weight parts) | Antimony trioxide | Heat-resistant aluminum hydroxide | Guanidine sulfamate |
| Example 16 | 30 | 100 | 45 | 45 | 10 |
| Example 17 | 30 | 100 | 150 | 20 | 10 |
| Example 18 | 30 | 100 | 80 | 20 | 10 |
| Example 19 | 30 | 100 | 100 | 20 | 10 |
| Comparative Example 15 | 30 | 100 | 30 | 60 | 10 |
| Comparative Example 16 | 30 | 100 | 30 | 60 | 5 |
| Comparative Example 17 | 30 | 100 | 30 | 40 | 10 |
| Comparative Example 18 | 30 | 100 | 30 | 40 | 5 |

TABLE 13

| | Burning time with flaming (sec) | Burning time without flaming (sec) | Cotton ignition yes/no | UL rating |
|---|---|---|---|---|
| Example 16 | 3 | 10 | No | V-0 |
| Example 17 | 4 | 5 | No | V-0 |
| Example 18 | 6 | 8 | No | V-0 |
| Example 19 | 4 | 7 | No | V-0 |
| Comparative Example 15 | 7 | 10 | Yes | V-2 |
| Comparative Example 16 | 15 | 16 | Yes | V-2 |
| Comparative Example 17 | 6 | 18 | Yes | V-2 |
| Comparative Example 18 | 20 | 20 | Yes | V-2 |

Tables 12 and 13 indicate that the UL rating of V-0 can be maintained even when the content of alnico-based magnetic powder is increased to 30 vol %.

Based on the Examples 8–19 described above, it was possible to confirm that setting the respective addition amounts within prescribed ranges makes it possible to achieve exceptional flame retardancy in flame-retardant resin magnet materials obtained using alnico-based magnetic powders as magnetic powders, and heat-resistant aluminum hydroxide, antimony trioxide, and guanidine sulfamate as flame retardants. Because excellent flame retardancy is achieved in flame-retardant resin magnet materials whose content of alnico-based magnetic powders ranges from low to high, these materials meet the wide range of requirements related to the magnetic characteristics needed for the annular magnets used in electron beam adjustment apparatus. It was also confirmed that using a heat-resistant aluminum hydroxide with a decomposition temperature of 280° C. or higher prevents the release of the $H_2O$ resulting from the endothermic/dehydiration reactions involving the heat-resistant aluminum hydroxide and occurring at the molding temperature during the molding of annular magnets, and yields moldings that are devoid of voids, warping, deformation, or the like.

EXAMPLES 20–25

The magnetic powder was subsequently changed from an alnico-based magnetic powder to a ferrite-based magnetic powder, and flame-retardant resin magnet materials were fabricated using flame retardants made with heat-resistant aluminum hydroxide, antimony trioxide, and guanidine sulfamate in the same manner as when the flame retardants used in Examples 8–19 were compounded. The resulting flame retardancy was evaluated. Table 14 shows the mixing ratios of materials, and Table 15 shows the results of combustion tests. The test pieces used measured 0.9 mm and 1.3 mm.

TABLE 14

| | Magnetic powder content (vol %) | Polyamide resin (weight parts) | Flame retardant (weight parts) | | |
|---|---|---|---|---|---|
| | | | Antimony trioxide | Heat-resistant aluminum hydroxide | Guanidine sulfamate |
| Example 20 | 40 | 100 | 30 | 30 | 8 |
| Example 21 | 40 | 100 | 60 | 30 | 8 |
| Example 22 | 40 | 100 | 30 | 40 | 8 |
| Example 23 | 40 | 100 | 60 | 40 | 8 |
| Example 24 | 40 | 100 | 30 | 30 | 8 |
| Example 25 | 40 | 100 | 60 | 40 | 8 |
| Comparative Example 19 | 40 | 100 | 20 | 20 | 8 |
| Comparative Example 20 | 40 | 100 | 20 | 20 | 25 |
| Comparative Example 21 | 40 | 100 | 20 | 40 | 10 |
| Comparative Example 22 | 40 | 100 | 20 | 40 | 25 |
| Comparative Example 23 | 40 | 100 | 20 | 40 | 5 |
| Comparative Example 24 | 40 | 100 | 20 | 20 | 5 |

TABLE 15

| | Burning time with flaming (sec) | Burning time without flaming (sec) | Cotton ignition yes/no | UL rating |
|---|---|---|---|---|
| Example 20 | 3 | 10 | No | V-0 |
| Example 21 | 4 | 5 | No | V-0 |
| Example 22 | 6 | 8 | No | V-0 |
| Example 23 | 4 | 7 | No | V-0 |
| Example 24 | 7 | 10 | No | V-0 |
| Example 25 | 7 | 16 | No | V-0 |
| Comparative Example 19 | 7 | 18 | Yes | V-2 |
| Comparative Example 20 | 7 | 29 | Yes | V-2 |
| Comparative Example 21 | 5 | 14 | Yes | V-2 |
| Comparative Example 22 | 4 | 29 | Yes | V-2 |
| Comparative Example 23 | 8 | 8 | Yes | V-2 |
| Comparative Example 24 | 8 | 7 | Yes | V-2 |

Based on Tables 14 and 15, it was confirmed that, similiar to when an alnico-based magnetic powder is used, a UL rating of V-0 be achieved using a ferrite-based magnetic powder as the magnetic powder. As in the above-described examples of the use of alnico-based magnetic powders, annular magnets molded using flame-retardant resin magnet materials to which the ferrite-based magnetic powder had been added were found to be free from no voids, warping, deformation, or the like.

EXAMPLES 26, 27

It had been established in Examples 1–3 and Comparative Examples 4–6 that $r<4$ $\mu$m was the preferred range for the average particle size r of heat-resistant aluminum hydroxide when this heat-resistant aluminum hydroxide was used together with antimony trioxide as a flame retardant. To confirm that this range of numeric values was also applicable to cases in which guanidine sulfamate was added to the heat-resistant aluminum hydroxide and antimony trioxide, the average particle size of the heat-resistant aluminum hydroxide in flame-retardant resin magnet materials containing guanidine sulfamate was varied, and combustion tests were performed on test pieces. Table 16 shows the mixing ratios of materials in the flame-retardant resin magnet materials used in the tests, and Table 17 shows the test results. An alnico-based magnetic powder was used as the magnetic powder.

TABLE 16

| | Magnetic powder content (vol %) | Polyamide resin (weight parts) | Flame retardant (weight parts) | | |
|---|---|---|---|---|---|
| | | | Antimony trioxide | Heat-resistant aluminum hydroxide | Guanidine sulfamate |
| Example 26 | 24 | 100 | 80 | 40 (average particle size 1.5 $\mu$m) | 10 |
| Example 27 | 24 | 100 | 80 | 40 (average particle size 3.0 $\mu$m) | 10 |
| Comparative Example 25 | 24 | 100 | 80 | 40 (average particle size 4.0 $\mu$m) | 10 |
| Comparative Example 26 | 24 | 100 | 80 | 40 (average particle size 5.0 $\mu$m) | 10 |

TABLE 17

| | Burning time with flaming (sec) | Burning time without flaming (sec) | Cotton ignition yes/no | UL rating |
|---|---|---|---|---|
| Example 26 | 4 | 5 | No | V-0 |
| Example 27 | 6 | 7 | No | V-0 |
| Comparative Example 25 | 9 | 8 | Yes | V-2 |
| Comparative Example 26 | 15 | 18 | Yes | V-2 |

As shown in Table 17, it was confirmed that flame retardancy was inadequate when the average particle size r of the heat-resistant aluminum hydroxide was greater than 4 $\mu$m. This was attributed to the fact that surface activity was inhibited and the decomposition of the heat-resistant aluminum hydroxide could not proceed properly, as described above. When, conversely, the average particle size r was less than necessary, the specific surface increased, resulting in diminished compounding with synthetic resins, thus adversely affecting resin fluidity during injection molding, and markedly reducing productivity. Based on this, it was concluded that the average particle size r of the heat-resistant aluminum hydroxide should preferably be such that $1\ \mu m<r<4\ \mu m$.

The flame-retardant resin magnet material of the present invention can yield resin magnet products that have excellent flame retardancy, produce virtually no toxic substances during burning, and are not a concern in terms of environmental pollution. In addition, the resulting moldings are free from voids, warping, deformation, or the like, making it possible to mass-produce high-precision moldings with a very low percent defective.

Electron beam adjustment apparatus fabricated using this flame-retardant resin magnet material can be made into products that are also highly flame retardant and produce virtually no toxic substances when incinerated during product disposal. The material can therefore be used to advantage in applications that generate large amounts of heat, such as large-screen television sets and high-resolution displays.

What is claimed is:

1. A flame-retardant resin magnet material, obtained by adding
   - (Z) an alnico:-based magnetic powder or a ferrite-based magnetic powder to a flame-retardant resin composition that is itself obtained by adding heat-resistant aluminum hydroxide and antimony trioxide to a polyamide resin in the following amounts:
   - (A) per 100 weight parts polyamide resin;
   - (B) X1 weight parts heat-resistant aluminum hydroxide with a decomposition temperature of 280° C. or higher (where 10 weight parts<X1<70 weight parts); and
   - (C) X2 weight parts antimony trioxide (where 40 weight parts<X2<270 weight parts).

2. A flame-retardant resin magnet material, obtained by adding
   - (Z) an alnico-based magnetic powder or a ferrite-based magnetic powder to a flame-retardant resin composition that is itself obtained by adding heat-resistant aluminum hydroxide, antimony trioxide, and zinc borate to a polyamide resin in the following amounts:
   - (A) per 100 weight parts polyamide resin;
   - (B) X1 weight, parts heat-resistant aluminum hydroxide with a decomposition temperature of 280° C. or higher (where 10 weight parts<X1<70 weight parts);
   - (C) X2 weight parts antimony trioxide (where 40 weight parts<X2<250 weight parts); and
   - (D) X3 weight parts zinc borate (where 0 weight part<X3<20 weight parts).

3. A flame-retardant resin magnet material as defined in claim 1 or 2, wherein 50–10 vol % alnico-based magnetic powder or ferrite-based magnetic powder is added per 50–90 vol % polyamide resin.

4. A flame-retardant resin magnet material as defined in claims 1 or 2, wherein the average particle size r of the heat-resistant aluminum hydroxide is 1 $\mu$m<r<4 $\mu$m.

5. A flame-retardant resin magnet material, obtained by adding
   - (Z) an alnico-based magnetic powder or a ferrite-based magnetic powder to a flame-retardant resin composition that is itself obtained by adding heat-resistant aluminum hydroxide, antimony trioxide, and guanidine sulfamate to a polyamide resin in the following amounts:
   - (A) per 100 weight parts polyamide resin;
   - (B) X1 weight parts heat-resistant aluminum hydroxide with a decomposition temperature of 280° C. or higher (where 10 weight parts<X1<70 weight parts);
   - (C) X2 weight parts antimony trioxide (where 30 weight parts<X2<170 weight parts); and
   - (E) X4 weight parts guanidine sulfamate (where 5 weight parts<X4<20 weight parts).

6. A flame-retardant resin magnet material as defined in claim 5, wherein 45–5 vol % alnico-based magnetic powder or ferrite-based magnetic powder (Z) is added per 55–95 vol % flame-retardant resin composition obtained by adding (B), (C), and (E) to the aforementioned (A).

7. A flame-restardant resin magnet material as defined in claim 5 or 6, wherein the average particle size of the alnico-based magnetic powder is 40–80 $\mu$m.

8. A flame-retardant resin magnet material as defined in claim 5 or 6, wherein the ferrite-based magnetic powder is strontium ferrite or barium ferrite, and the average particle size thereof is 1.0–3.0 $\mu$m.

9. An electron beam adjustment apparatus mounted on the neck portion of a color Braun tube, wherein said electron beam adjustment apparatus is such that some or all of the quadrupole or sextupole convergence-adjusting magnets or dipole purity-adjusting magnets constituting this electron beam adjustment apparatus are fabricated from a flame-retardant resin magnet material as defined in claims 1, 2, 5 or 6.

* * * * *